US007689230B2

(12) United States Patent
Spadafora et al.

(10) Patent No.: US 7,689,230 B2
(45) Date of Patent: Mar. 30, 2010

(54) INTELLIGENT TRANSPORTATION SYSTEM

(75) Inventors: William G. Spadafora, Clarkston, MI (US); Perry M. Paielli, Brighton, MI (US); David R. Llewellyn, West Bloomfield, MI (US); Jason G. Kramer, Sterling Heights, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 927 days.

(21) Appl. No.: 11/096,956

(22) Filed: Apr. 1, 2005

(65) Prior Publication Data

US 2005/0221759 A1 Oct. 6, 2005

Related U.S. Application Data

(60) Provisional application No. 60/558,720, filed on Apr. 1, 2004.

(51) Int. Cl.
*H04W 24/00* (2006.01)

(52) U.S. Cl. .............. 455/456.1; 455/456.3; 455/456.6; 455/404.1; 455/569.2; 455/41.2

(58) Field of Classification Search .............. 455/456.1, 455/456.3, 456.6, 404.1, 569.2, 41.2
See application file for complete search history.

(56) References Cited

U.S. PATENT DOCUMENTS 4,350,970 A 9/1982 von Tomkewitsch
5,189,619 A 2/1993 Adachi et al.
5,285,523 A 2/1994 Takahashi
5,572,449 A 11/1996 Tang et al.
5,668,880 A 9/1997 Alajajian
5,710,565 A 1/1998 Shirai et al.
5,719,771 A 2/1998 Buck et al.
5,999,211 A 12/1999 Hedges et al.
6,056,374 A 5/2000 Hiwatashi
6,076,028 A 6/2000 Donnelly et al.
6,078,857 A 6/2000 Jung et al.
6,429,812 B1 8/2002 Hoffberg
6,463,272 B1 10/2002 Wallace et al.
6,545,638 B2 4/2003 Sladen
6,567,035 B1 5/2003 Elliott
6,597,278 B1 7/2003 Ando (Continued)

FOREIGN PATENT DOCUMENTS

DE 197 51 092 6/1999

(Continued)

OTHER PUBLICATIONS

International Search Report dated Aug. 9, 2005 (3 pges).

(Continued)

*Primary Examiner*—Barry W Taylor
(74) *Attorney, Agent, or Firm*—Rader, Fishman & Grauer PLLC

(57) ABSTRACT

A node for communications in a transportation network comprises a processor, a memory, a communication device, and a set of instructions executable by the processor for: extracting information from a first message, making a first determination based at least in part on the information; and making a second determination as to whether a second message should be sent based on the first determination.

17 Claims, 14 Drawing Sheets

U.S. PATENT DOCUMENTS

| | | | | |
|---|---|---|---|---|
| 6,791,471 | B2 * | 9/2004 | Wehner et al. | 340/903 |
| 7,420,954 | B2 * | 9/2008 | Elbatt et al. | 370/338 |
| 2001/0045891 | A1 | 11/2001 | Nakao et al. | |
| 2002/0011951 | A1 | 1/2002 | Pepin et al. | |
| 2002/0150050 | A1 | 10/2002 | Nathanson | |
| 2002/0165645 | A1 | 11/2002 | Kageyama | |
| 2002/0183882 | A1 | 12/2002 | Dearing et al. | |
| 2002/0198632 | A1 | 12/2002 | Breed et al. | |
| 2002/0198660 | A1 | 12/2002 | Lutter et al. | |
| 2003/0009270 | A1 | 1/2003 | Breed | |
| 2003/0009275 | A1 | 1/2003 | Koike | |
| 2003/0220131 | A1 | 11/2003 | Katayama et al. | |
| 2003/0234720 | A1 | 12/2003 | MacNeille et al. | |
| 2004/0078133 | A1 * | 4/2004 | Miller et al. | 701/96 |
| 2004/0193347 | A1 * | 9/2004 | Harumoto et al. | 701/45 |
| 2005/0088318 | A1 * | 4/2005 | Liu et al. | 340/902 |
| 2007/0063875 | A1 * | 3/2007 | Hoffberg | 340/995.1 |
| 2008/0176510 | A1 * | 7/2008 | Yuhara et al. | 455/3.02 |

FOREIGN PATENT DOCUMENTS

| | | |
|---|---|---|
| JP | 10153426 | 6/1998 |

OTHER PUBLICATIONS

Derwent Engligh Abstract for DE 197 51 092 (1 page).

* cited by examiner

INTELLIGENT TRANSPORTATION SYSTEM

RELATED APPLICATIONS

This application claims priority to U.S. Provisional application Ser. No. 60/558,720, filed Apr. 1, 2004, entitled "INTELLIGENT TRANSPORTATION SYSTEM", the contents of which are hereby incorporated herein by reference in its entirety.

FIELD

This application relates to transportation communication systems.

BACKGROUND

In 2001 the Federal Communications Commission (FCC) allocated a 75 MHz Radio Frequency (RF) spectrum to support Dedicated Short Range Communications (DSRC). DSRC is an IEEE standardized protocol that provides national interoperability for wireless communications to and from vehicles. DSRC also includes broadband connectivity with the Internet. Thus, development for the infrastructure needed to support wireless inter-vehicle communications has been in place for several years.

Further, as is well known, almost all vehicles manufactured since the 1980s have contained one or more microprocessors connected by a communications bus. These microprocessors can communicate with each other and can also provide output to, and accept input from, external sources. Various vehicle components and systems, such as the engine, brakes, transmission, emissions control system, and the like in land vehicles may have associated microprocessors for reporting on and/or controlling the component or system. For example, most automobiles and trucks manufactured today contain microprocessors communicating on a bus using CAN (controller area network) communications, as is well known.

Although information has been used to improve efficiency of a single vehicle, information has not been used to improve driving patterns and routes for an entire transportation system. Existing systems do not warn vehicles directly of hazards on the road, such as ice, snow, rain, oil, etc. Further, vehicles do not warn each other of known hazards or road conditions. Systems also don't exist that provide wide area warnings to vehicles of environmental disasters such as chemical spills, fires, or floods. Further, although some short range systems exist to expedite emergency vehicles, such systems do not warn surrounding vehicles of the emergency vehicle's need to progress. Rather, existing signaling devices may transmit infrared signals to street lights attempting to coerce a green light for the emergency vehicle, but disadvantageously fail to communicate directly with vehicles in an emergency vehicle's path.

Further, present communications systems are inefficient because they do not limit messages to vehicles within defined regions of interest, but rather allow such messages to be transmitted even to vehicles and other receivers for which the message is of no value. That is, present systems simply respond when they transmit and receive a message, rather than making a determination based upon the relative positions and/or directions of a message sender and a message receiver. A system that transmitted warning and other messages to vehicles for which such messages would be of value—and only to such vehicles—would thus present significant advantages over present systems.

Accordingly, a system is desired for cooperative communication between vehicles or land-base stations to facilitate a safe and efficient transportation system. Such a system would advantageously provide for hazard detection and warning, emergency vehicle prioritization, and directional messaging control, including providing for efficient long distance communication using intelligent repeaters.

SUMMARY

A node for communication in a transportation network comprises a processor, a memory, a communication device, and a set of instructions executable by the processor for; extracting information from a first message, making a first determination based at least in part on the information; and making a second determination as to whether a second message should be sent based on the first determination.

DETAILED DESCRIPTION

Introduction

Disclosed herein is an improvement to present technology that uses DSRC to enable direct communications between vehicles, thus providing safer and more efficient transportation and traffic flow. However, the embodiments disclosed herein do not require DSRC technology for implementation.

Figure 1:
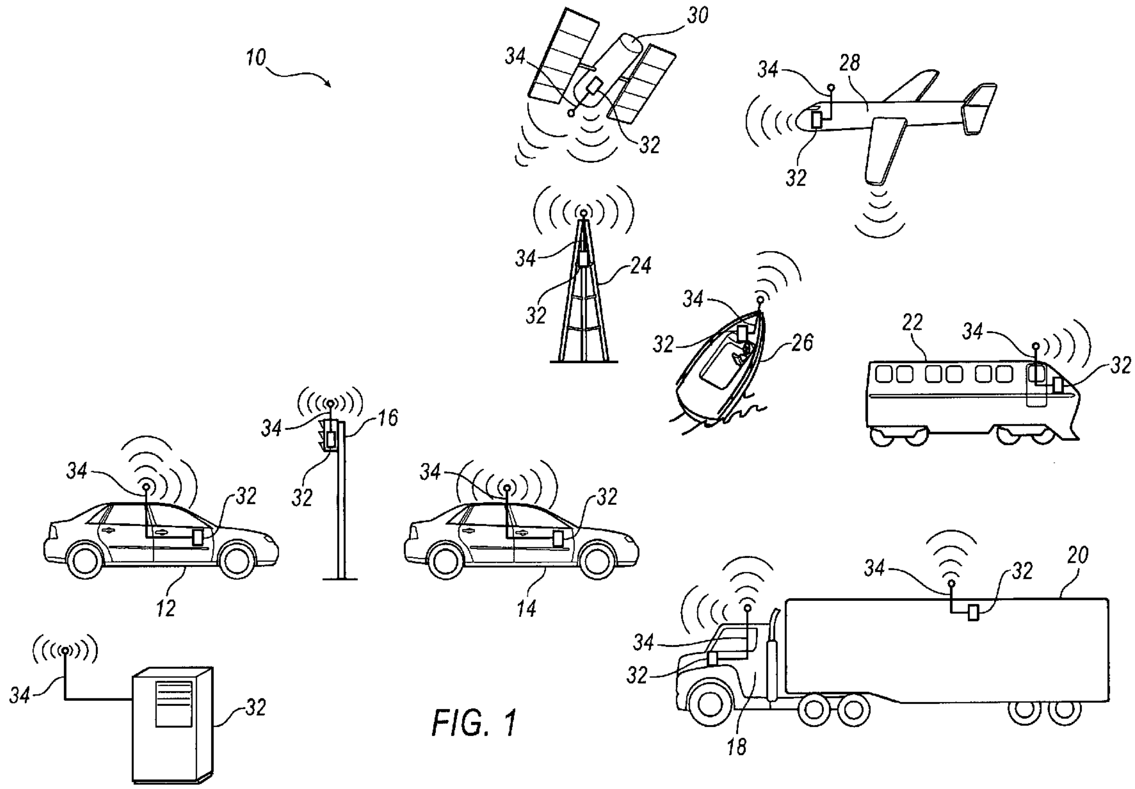
FIG. 1 illustrates an Intelligent Transportation System (ITS), according to an embodiment.

FIG. 1 illustrates an Intelligent Transportation System 10 (ITS) according to an embodiment. ITS 10 may comprise nodes 32 on a wide range of components, including automobiles 12, 14, a stationary traffic control 16, a long haul truck 18, a trailer 20, a train 22, a stationary wide area node 24, a boat 26, an aircraft 28, and a satellite 30. Vehicles are defined herein as any device that is not permanently fixed in three dimensions. As shown in FIG. 1, a node 32 is connected to a transmitter 34. In general, nodes 32 may be installed in any vehicle, or placed in more or less any location. It is to be understood that node 32 may be permanently installed in a vehicle or location, or may be removable and installable in other vehicles or locations. Further, nodes 32 may comprise pre-existing devices, such as handheld, laptop, or other portable computers, or other processing devices and/or wireless devices included within a vehicle.

Each node 32 of ITS 10 is designed to communicate with other nodes 32 such that traffic flow and safety can be improved. For example, stationary traffic control 16 node 32 could provide information to automobile 12, 14 node 32 to reduce speed because ice is detected at an intersection. Further, stationary wide area node 24 could send messages to a large geographic region concerning the weather, a vehicle accident affecting traffic through a wide area, etc. Although the present application discusses mainly surface transportation, it is to be understood that it is possible to have ITS 10 nodes 32 on aircraft 28, boats 26, and satellites 30.

Figure 2:
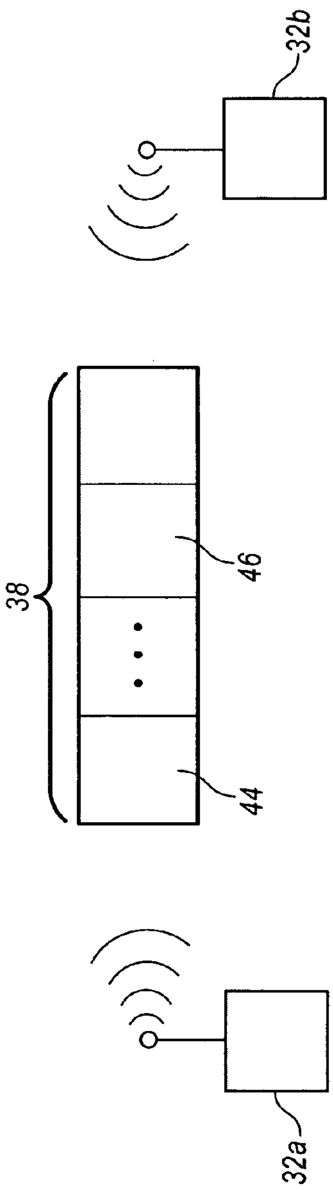
FIG. 2 illustrates an ITS message transmitted between two ITS nodes, according to an embodiment.

FIG. 2 illustrates a message 38 transmitted between two nodes 32 according to an embodiment. Because nodes 32 are networked, communication between nodes 32 is at the heart of the ITS 10. A first ITS node 32*a*, including an En-route Navigation and Situation Awareness Module (ENSAM) 100 and an RF transceiver and Data Link 110, e.g. a communication device, transmits message 38 to a second ITS node 32*b*. Message 38 is a radio frequency (RF) message encoded with information. Portions of message 38, such as a first packet 44 and a second packet 46, may describe details concerning the transmitting node 32*a*, the nature of message 38, and the direction message 38 is intended to travel, etc. Examples of message 38 structure and contents are provided and explained in detail below with respect to FIGS. 10-16.

Many types of message 38 content and formatting may be used with ITS 10. Embodiments are possible in which message 38 formats are other than those described herein. Moreover, message 38 may have a variable message structure that allows for message 38 to change content and structure, or be arbitrary in nature. Packets 44, 46, described in more detail below with respect to FIGS. 7-16, are transmitted by RF transceiver and Data Link 110, and may include some or all of the following, but are not limited to:

- Unique identification code—a unique number, analogous to an Internet Protocol (IP) address on a computer network, which identifies a device as an entity operating within ITS 10.
- Classification codes—identify at a primary level whether, for example, a vehicle is a ground, rail, marine, or air vehicle. At a secondary level, classification codes identify the sub-category, such as a vehicle use, e.g., passenger transport, utility (e.g., electric company, garbage truck, etc.), emergency vehicle, law enforcement, mass transit, materials handling/construction, freight and cargo. At a tertiary level, other information, such as the identity of cargo (e.g., explosive) or vehicle type or function (e.g., snow plow) may be given.
- Dynamics data, including:
  - Precise location (i.e., latitude and longitude);
  - Location identified by map routes (i.e., roads, intersections, etc.);
  - Inertial Measurement Data (tri-axial acceleration, angular rate);
  - Speed and trajectory (calculated from inertial data) in the case of vehicles;
  - Weight in the case of embodiments utilizing vehicles;
  - Dimensions (length, width, and height);
  - Health (i.e., operational status);
  - Status (e.g., normal, in distress, emergency, etc.).

It should be understood that ITS 10 is a network, and that vehicles participating in ITS 10 are essentially nodes 32 on the network. That is, vehicles 12, 14, 18, etc. communicate with each other through other network nodes 32, i.e., through other vehicles 12, 14, 18, etc. However, stationary structures 16, 24 may also comprise network nodes 32 as is discussed below. Accordingly, ITS 10 network nodes 32 generally comprise repeaters that relay signals to and from other network nodes 32. Generally, RF transceiver and Data Link 110 transmits omni-directional packets 44, 46, etc., although broadcasts of packets 44, 46, etc. with specific directionality are possible, and are sometimes desirable. When it is desirable to broadcast packet 44, 46, etc. to a specific, known destination, or in a specific direction, a direction vector can be described between the sending and receiving points, and information relating to the direction vector can be included in the broadcast packet 44, 46, etc. When a broadcast reaches a repeater, i.e., another network node 32, packet 44, 46, etc. is rebroadcast only when the repeater lies between the point of origin of packet 44, 46, etc. and its destination. Examples of directional communication are provided and discussed in detail with respect to FIGS. 13-15, 22.

Figure 3:
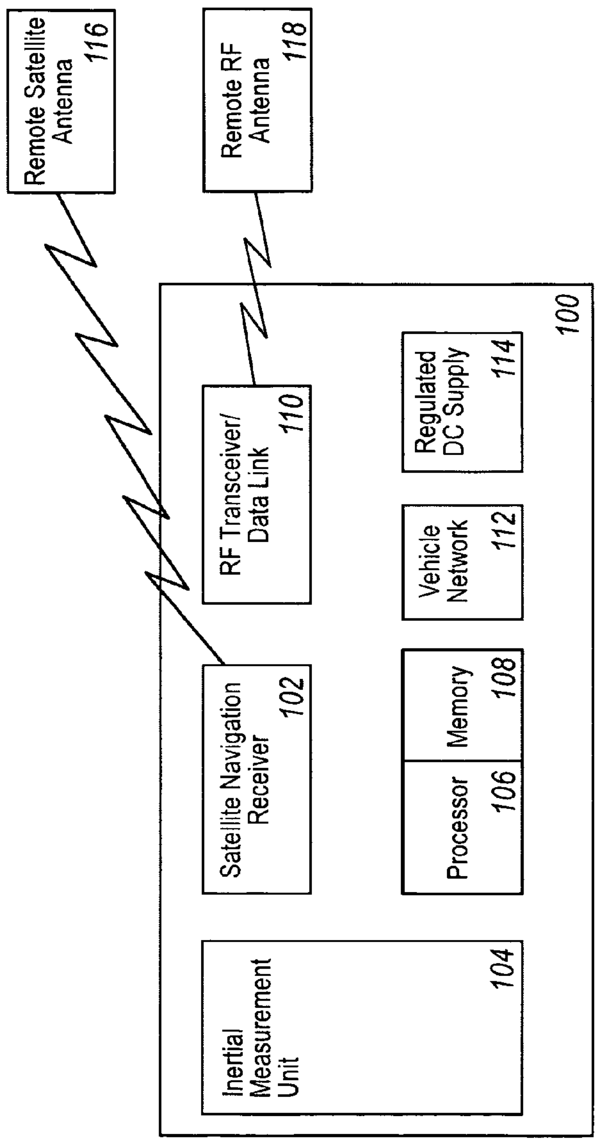
FIG. 3 illustrates an En-route Navigation and Situation Awareness Module (ENSAM) according to an embodiment.

FIG. 3 illustrates En-route Navigation and Situation Awareness Module (ENSAM) 100 according to an embodiment. ENSAM 100 is a collection of components, in some embodiments included on an electronic card, that resides on board a vehicle. In some embodiments, the vehicle is an automobile 12 or 14, while in other embodiments the vehicle could be a truck 18, boat 26, aircraft 28, heavy equipment, train, etc. As mentioned above, embodiments described herein generally pertain to land vehicles, but it is to be understood that the claimed invention may also be practiced in all types of vehicles in addition to all types of land vehicles.

According to an embodiment, ENSAM 100 includes the following components: a Satellite Navigation Receiver 102, an Inertial Measurement Unit 104, e.g. position sensors, a processor 106 with a memory 108, RF transceiver and Data Link 110, a Vehicle Network 112, and a power supply 114. RF transceiver and Data Link 110 sends and receives signals to and from a Remote Satellite Antenna 116 and a Remote RF Antenna 118.

Satellite Navigation Receiver 102 is generally a Global Navigation Satellite System (GNSS) receiver or some similar receiver known to those skilled in the art. Satellite Navigation Receiver 102 generally utilizes known satellite navigation technologies such as a Wide Area Augmentation System (WAAS) or similar technologies such as the Global Positioning System (GPS).

Inertial Measurement Unit 104, known by those skilled in the art, provides high resolution situational awareness of a vehicle's acceleration and angular velocity through the use of dual tri-axial integrated accelerometers and angular rate measurement units. Accordingly, it is understood that inertial measurement unit 104 provides inertial data in Six Degrees of Freedom.

Inertial measurement unit 104 can be used to augment Satellite Navigation Receiver 102, which may lose signals when a vehicle goes through tunnels, under bridges, or near tall buildings or other structures. Thus, data from Satellite Navigation Receiver 102 and Inertial Measurement Unit 104 can be integrated to obtain the most accurate position and velocity data possible. Inertial Measurement Unit 104 can function alone when the signal from Remote Satellite Antenna 116 is lost; when a signal is regained, Satellite Navigation Receiver 102 and Inertial Measurement Unit 104 can be programmed to automatically calibrate and synchronize with each other as necessary.

It should be noted that, although Satellite Navigation Receiver 102 and RF transceiver and Data Link 110 are shown on FIG. 1 as separate components, in some embodiments they could be combined inasmuch as they both perform a communications function. In other embodiments, Satellite Navigation Receiver 102 could be connected to RF transceiver and Data Link 110 to receive signals received from Remote Satellite Antenna 116. Similarly, in some embodiments, Satellite Navigation Receiver 102, which comprises a processor and a memory, could be combined with processor 106 and memory 108.

Processor 106 and memory 108 could be any of a number processors and memory and/or micro-computer systems that are known in the art. Memory 108 comprises a read only memory (ROM) that stores instructions executable by processor 106, including control heuristics for determining directives to be executed, or information such as warnings to be given, by a vehicle. Alternately, memory 108 could comprise other kinds of memory such as RAM, FLASH, or EEPROM.

RF transceiver and Data Link 110 comprises an on-board radio transceiver capable of communicating with radio transceivers on board other vehicles or with fixed locations. Essentially, RF transceiver and Data Link 110 function as a network node, a network router, and a communications repeater. The primary function of RF transceiver and Data Link 110 is to transmit and receive real-time operational and event data, including information, warnings and alerts, relating to a vehicle or to traveling conditions such as the condition of a roadway. Accordingly, RF transceiver and Data Link 110 is capable of receiving ITS information, warnings, and alerts from other vehicles or fixed locations that are part of ITS 10. RF transceiver and Data Link 110 may also have the ability to adjust power output in order to selectively communicate at short range, or alternatively, boost power to send messages over long distances.

Vehicle network 112 generally comprises a network such as a controller area network (CAN) or any other type of communications network in a vehicle that is among those known to those skilled in the art. Any known vehicle network may be used in practicing the invention. Power supply 114 in some embodiments is a DC power supply. Remote Satellite Antenna 116 and Remote RF Antenna 118 are part of an existing global telecommunications infrastructure, and as such are well known to those skilled in the art.

Figure 4:
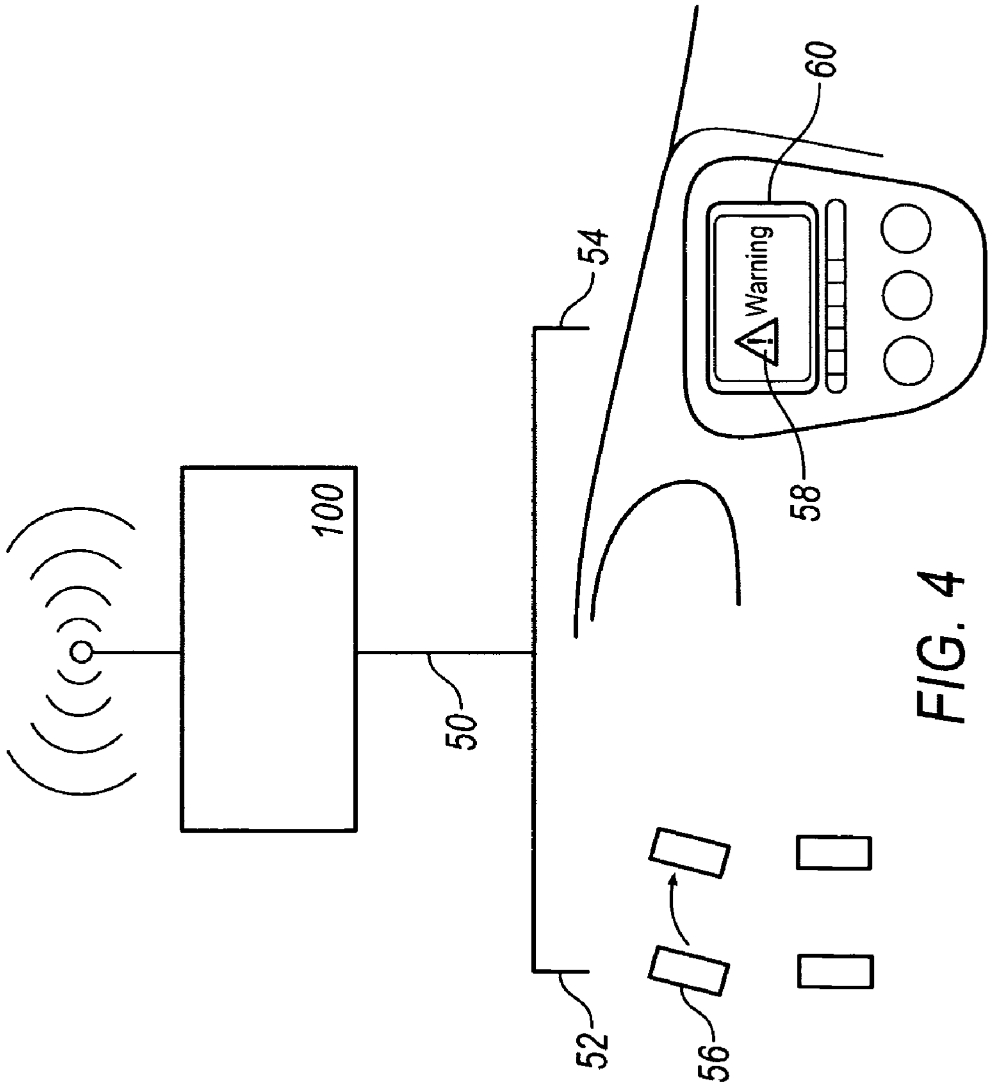
FIG. 4 illustrates an ENSAM of FIG. 1 issuing a drive by wire instruction and a display warning instruction to a vehicle, according to an embodiment.

Generation of Information, Warnings, Vehicle Instructions, and Drive by Wire Instructions FIG. 4 illustrates an ENSAM 100 issuing directives over a vehicle bus 50 in the form of a vehicle instruction 52 or an information instruction 54 such as a warning within a specific vehicle. In the example, vehicle instruction 52 and information instruction 54 are shown in combination with automobile 12. In general, ENSAM 100 receives message 38 and determines an action in response to message 38. Examples of such decision making are provided and discussed in detail below with respect to FIGS. 7-9.

Information instruction 54 may be used to send information to various electronic control units (ECU's) may display information or sounds to persons in the vehicle or to ECU's that are not readily perceivable. Information instruction 54 sent to the ECU's could be simple information such as time, date, temperature etc. or it may be more detailed information such as wheel speed, or angular acceleration. Alternately information instruction 54 may be a warning to be displayed to the driver with visual our sound as the warning.

Vehicle instruction 52 may be used to compel a vehicle to take an action, refrain from an action, or to wait for further instructions. Vehicle instruction 52 could cause a vehicle to stop, turn, accelerate, or hold position. Alternately, vehicle instruction 52 could be a high level navigation function instructing the vehicle to assume a certain route or destination.

Briefly, in the embodiment shown in FIG. 4, ENSAM 100 is connected to automobile 12, and determines that both vehicle instruction 52 and information instruction 54 are to be issued. ENSAM 100 then transmits vehicle instruction 52 along vehicle bus 50, which is connected to vehicle network 112 of ENSAM 100, where the vehicle instruction 52 is received by an ECU, known to those skilled in the art, in vehicle 12. The ECU is programmed to cause vehicle wheels 56 to immediately respond to vehicle instruction 52, in this case a drive by wire instruction, by turning. Information instruction 54 is similarly transmitted on vehicle bus 50. A navigation display 60 receives information instruction 54, and displays the appropriate information symbol 58 and/or other information provided by message 38.

Event Detection and Reporting

Those skilled in the art will recognize that when vehicle 12, 14, 18, etc. is in operation, a wealth of information is generally available over vehicle network 112. For example, vehicle network 112 generally makes available, in real or near real time, information regarding the state of numerous vehicle components, including engine, brakes, and emissions, to name a few. Further, it will be understood that almost any vehicle 12, 14, 18, etc. component can be monitored and reported on using an appropriate sensor in the vehicle 12, 14, 18, etc., information provided by such sensors being made available over vehicle bus 50. Further, vehicle sensors can be deployed to detect events external to the vehicle 12, 14, 18, etc. For example, vehicle sensors could be used to detect potholes, bumps, or other variations in road conditions.

Accordingly, when certain events are detected, processor 106 is programmed to selectively report the event to other vehicles based on such events. For example, a sensor might detect a loss of pressure in a lubrication system and report this event to processor 106, which in turn is programmed to recognize that this event means there is a very high probability that a lubricant has been spilled on the road, creating hazardous conditions for other vehicles. Accordingly, processor 106 causes RF transceiver and Data Link 110 to transmit this information to other vehicles that may be at risk, in this case lagging vehicles behind the vehicle containing processor 106 that has caused information to be transmitted. Similarly, highway maintenance crews may be automatically sent information relating to vehicle events so they can react, e.g., by proceeding to clean up roadways. Other examples of events include, but are far from limited to, the approach of law enforcement or rescue vehicles, sudden changes in speed of surrounding vehicles, vehicles or other large objects located near the side of a roadway, changing weather conditions, loads shifting in transport equipment such as tractor-trailers, etc. Examples of events that may be reported to other vehicles are provided and discussed in detail with respect to FIGS. 5, 6A, and 6B.

Certain steps that may be executed in processor 106 are described in further detail below. However, in general, steps that might be executed in processor 106 include the following:

1. Record some event, e.g., position, speed, health, or some external event such as a pothole or car 12, 14 pulled over by the side of the road.
2. Determine the significance of the event, e.g., should the vehicle slow down, speed up, or stop.
3. Determine whether to send message 38 to other vehicles or nodes 32, and if so, determine the direction in which message 38 should be sent, that is, to all vehicles on the road, to select vehicles ahead, or to vehicles behind.
4. Send message 38 if warranted.
5. Act on the determination of step 2 by issuing a directive within one or more vehicles. The directive may include information instruction 54 or vehicle instruction 52 to automatically cause the vehicle to take some action such as braking or speeding up.

Alternatively, step 1 above could comprise processor 106 receiving message 38 comprising an event or warning, in which case step 3 would comprise determining whether message 38 should be rebroadcast (and if so, in what direction or directions). Further, in some embodiments, message 38 received could itself be a directive such as a drive-by-wire instruction, in which case processor 106 may be configured simply to execute the drive-by-wire instruction, or processor 106 may be configured to determine whether the drive-by wire instruction should be executed.

Figure 5:
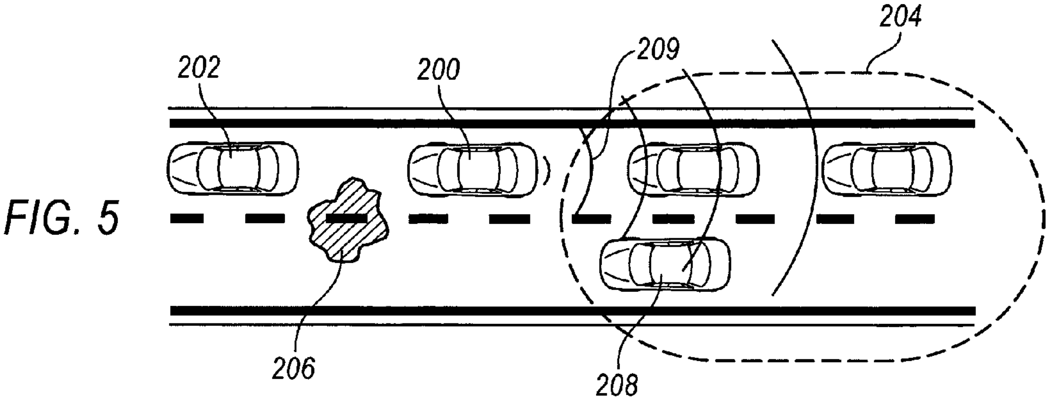
FIG. 5 illustrates detection of a road hazard, and broadcast of a wireless warning to other vehicles, according to an embodiment.
Figure 6A:
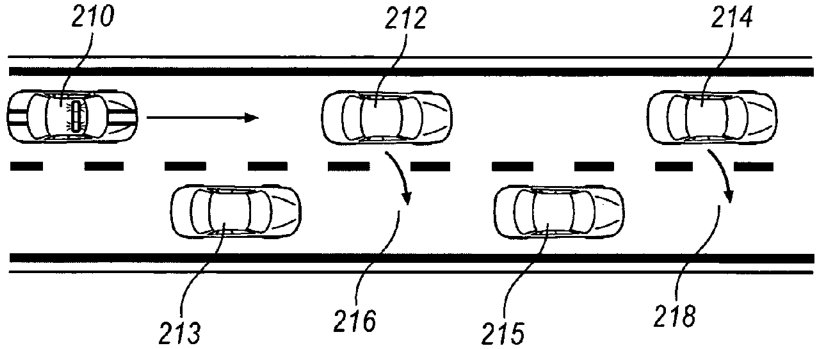
FIG. 6A illustrates an emergency vehicle requiring a clear lane of traffic that is hindered by blocking vehicles, according to an embodiment.

FIG. 5 illustrates detection of a road hazard 206 and broadcast of a wireless warning 209 to notify other vehicles of road hazard 206. A detecting vehicle 200 detects road hazard 206 via sensors and transmits wireless warning 209. Vehicles 12, 14, 18, etc. within a zone of danger 204 receive the wireless warning 209 and respond appropriately. The response by ENSAM 100 within hazarded vehicle 208 may be to produce wireless warning 209 to the driver, or the response may be to reduce the speed of vehicle 208 as appropriate. Although wireless warning 209 is physically transmitted omni-directionally, FIG. 6A illustrates how reception of wireless warning 209 is directional in nature. Thus, an uninterested vehicle 202 does not respond to wireless warning 209. However, because a hazarded vehicle 208 is approaching road hazard 206, the hazarded vehicle 208 does receive wireless warning 209 and respond to road hazard 206. The directional nature of wireless warning 209 is explained below in further detail with respect to FIGS. 13-15, 22.

FIG. 6A specifically illustrates an emergency vehicle 210 requiring a clear lane of traffic that is hindered by blocking vehicles 212 and 214. Blocking vehicles 212, 214 impede progress of emergency vehicle 210 and should move to the right to provide a clear lane. In this case, emergency vehicle 210 provides a high priority warning to all vehicles ahead which signals them to provide an open lane. Here, slower vehicles 213 and 215 are spaced at a safe following distance and provide gaps 216 and 218. As blocking vehicles 212, 214 receive the high priority warning, their ENSAMs 100 respond by warning the driver of the approaching emergency vehicle 210. However, ENSAM 100 in each of blocking vehicles 212, 214 may also provide a direct vehicle instruction 52, such as a drive-by-wire instruction, to vehicle network 112 commanding a lane change.

Figure 6B:
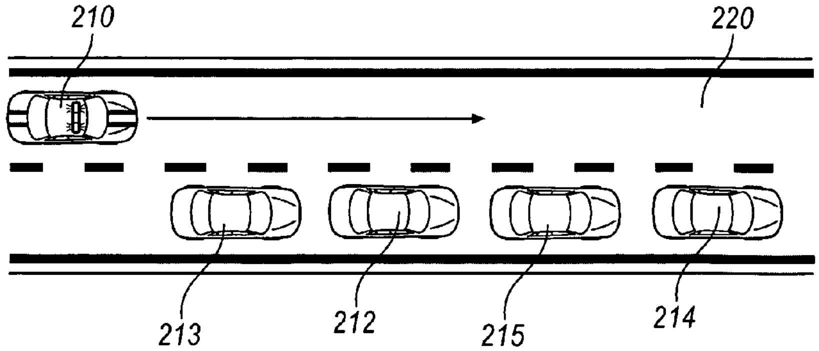
FIG. 6B illustrates the results of a warning being received by blocking vehicles, according to an embodiment.

FIG. 6B illustrates the results of wireless warning 209 being received by blocking vehicles 212 and 214. Blocking vehicles 212, 214 are merged with slower traffic 213, 215, thereby clearing an open lane 220 for emergency vehicle 210 as described above in FIG. 6A. Further, ITS 10 also provides for the merging operation to be performed without slowing traffic. That is to say, emergency vehicle 210 may pass blocking vehicles 212, 214, and also slower vehicles 213, 215, without appreciably slowing down traffic. If, for example, emergency vehicle 210 was required to turn ahead of blocking vehicles 212, 214, the high priority message 38 sent may include a directive to slow or stop traffic so that the turn could be accomplished more efficiently.

Figure 7:
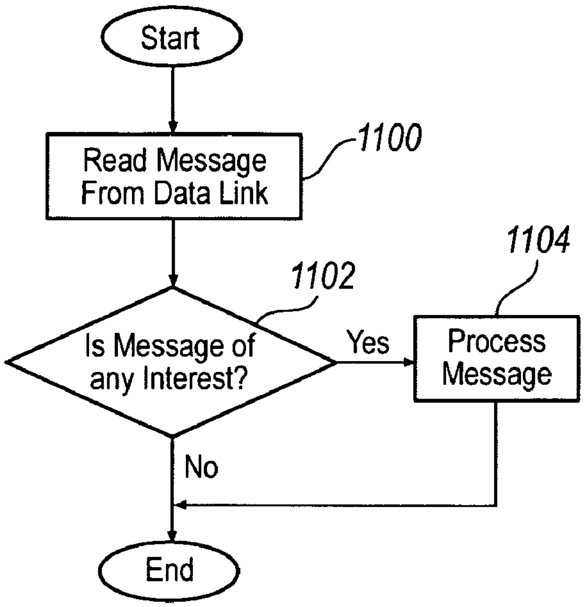
FIG. 7 illustrates a diagram of processor after receiving an ITS message to determine if the ITS message should be processed, according to an embodiment.

FIG. 7 provides a process flow for a processor 106, according to an embodiment, after receiving message 38 to determine whether and/or how message 38 should be processed. Processor 106 is programmed to analyze and respond to messages 38 received from other ITS nodes 32. When RF transceiver and Data Link 110 receives a transmission, packets 44, 46 comprising the transmissions are parsed by processor 106 to determine if message 38 containing information concerning an event has been received. Assuming that message 38 contains event information has been received, processor 106 must determine whether to (1) ignore message 38, (2) communicate specific information, such as information instruction 54, based on message 38, or (3) generate vehicle instruction 52, such as a drive-by-wire instruction, based on message 38. Accordingly, processor 106 is generally provided with instructions for determining which of these three courses to follow upon receipt of message 38.

Processor 106 may determine that a received message 38 does not require information instruction 54 or vehicle instruction 52 to be given or any action to be taken. To continue the example given above, suppose a first car on a highway receives message 38 that a second car, behind the first car, may have leaked lubricating fluid onto the highway. In this case, the first car, based upon an analysis of its speed and position relative to the second car, would need to take no precautionary action based on the second car's leakage of lubricating fluid. Accordingly, for leakage events, processor 106 would be programmed to determine the relative location of vehicles before determining whether to issue information instruction 54 or generate vehicle instruction 52.

Accordingly, certain embodiments discussed herein use the high level process depicted in FIG. 7 for reading messages 38. The high level process may be used to determine if the receiving node 32 is the intended node 32 for receiving message 38. In step 1100, the process reads message 38 from the RF transceiver and Data Link 110.

In step 1102, the process determines if message 38 is of any interest. For example, if message 38 concerns a road hazard 206 that vehicle 12, 14, 18, etc. has passed, it will not be of interest. On the other hand, road hazards 206 ahead of vehicle 12, 14, 18, etc. would be of interest. If message 38 is of interest, control proceeds to step 1104. Otherwise, the process ends.

In step 1104, message 38 is processed. Processing of message 38 may include communicating specific information or an instruction as described above. Message processing 1104 may also include any other sub-process performed by processor 106 that uses information contained in message 38. Thus, message processing 1104 may include includes significance testing, threshold testing, repeater functionality. These separate processes are explained in detail below with respect to FIGS. 7-16

The process described in FIG. 7 ends following step 1104.

Figure 8:
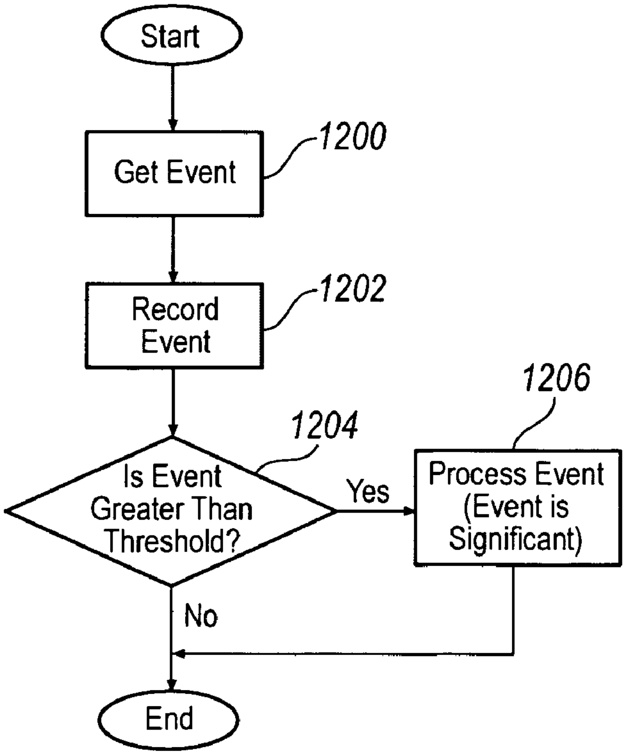
FIG. 8 illustrates a diagram for determining the significance of an event, according to an embodiment.

FIG. 8 illustrates a diagram for determining the significance of an event, according to certain embodiments. In step 1200, the process gets an event, which may be message 38, an event generated by automobile 12 or 14, or by ENSAM 100, etc.

In step 1202, the event is recorded to memory 108.

In step 1204, processor 106 checks a value assigned to the event against a predetermined threshold to determine whether the event is significant. For example, processor 106 might be programmed to consider any event assigned a value greater than “6” on a “10” point scale to be significant. To continue the example, the necessity of vehicle 210 to pass, as illustrated in FIG. 6A above, might be assigned a value of “10”, while a minor pothole might be assigned a value of “2”. If the event is greater than the threshold, control proceeds to step 1206; otherwise, the process ends.

In step 1206, processor 106 continues to process the event since the event has been determined to be significant. Processing an event may include generating message 38, or a communication, such as vehicle instruction 52, or information instruction 54.

For example, a vehicle may comprise a display connected to processor 106. When receiving notification of an event, processor 106 may cause information instruction 54 (e.g. warning) to be displayed to the user, e.g., “OIL SLICK AHEAD” before displaying such a warning, processor 106 would have first determined that the reported event was relevant to the vehicle. For example, a first car behind a second car on a highway would be affected when the second car leaked lubricating fluid onto the highway. As noted above, for leakage events, processor 106 would be programmed to determine the relative location of vehicles before determining whether to issue information instruction 54.

To take another example of processing conducted in step 1206, in some embodiments processor 106 may determine that a drive by wire instruction should be generated based on a received message 38. A drive by wire instruction is sent from processor 106 via vehicle network 112 to a vehicle component, generally to alter vehicle speed, position, and/or direction. For any component configured to receive drive by wire instructions the mechanical links between control input and the component being controlled have been removed and replaced by input sensors, intelligent actuators, and feedback systems. For example, making a steering column responsive to drive by wire instructions would mean that the vehicle would be controlled by actuators and feedback mechanisms rather than by mechanical driver inputs to the steering column via the steering wheel. A control heuristic executed by processor 106 would provide optimal inputs to apply all critical systems. In general, drive by wire instructions may be sent to components in three categories: throttle, steering, and brakes. Accordingly, it is possible to achieve complete integration of engine control, anti-lock brake, traction control, torque management, stability management, and thermal management systems.

To continue the example used above, upon receipt of message 38 that lubricating fluid may have been spread on the road ahead, processor 106 may be programmed to decrease vehicle speed to below a safe threshold, or to change lanes to avoid the lane onto which lubricating fluid had been leaked. In this way, processor 106 directs what may be referred to as preemptive and predictive cruise control.

The process ends following steps 1204 or 1206.

Figure 9:
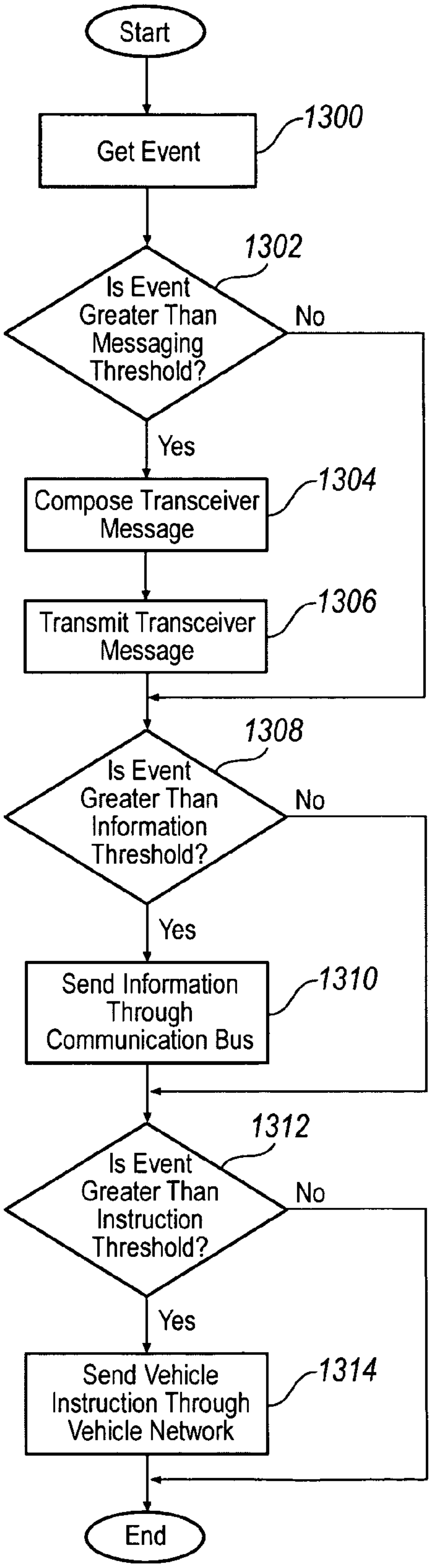
FIG. 9 illustrates a diagram for determining the proper course of action for a significant event, according to an embodiment.

FIG. 9 illustrates a diagram for determining the proper course of action for a significant event, according to an embodiment. In step 1300, notification of an event is received from ENSAM 100. Control proceeds to step 1302.

In step 1302, the process checks a value associated with the event against a predetermined messaging threshold, e.g., a threshold such as described above regarding step 1206. The purpose of the predetermined threshold described with respect to this step is to allow a determination as to whether message 38 should be sent. Accordingly, if the event value is greater than the predetermined threshold, control proceeds to step 1304. Otherwise, control proceeds to step 1308.

In step 1304, the process composes message 38 to be sent from ENSAM 100 via RF transceiver and Data Link 110. Control proceeds to step 1306.

In step 1306, RF transceiver and Data Link 110 transmits message 38. Control proceeds to step 1308.

In step 1308, the process checks a value associated with the event against a predetermined information instruction 54 threshold, e.g., a threshold such as described above regarding step 1206. The purpose of the predetermined threshold described with respect to this step is to allow a determination as to whether an internal communication, providing information to a user interface, such as information instruction 54, should be generated. Accordingly, if the event value is greater than the information instruction 54 threshold, control proceeds to step 1310. Otherwise, control proceeds to step 1312.

In step 1310, the process composes and transmits information instruction 54 via Vehicle Network 112. Control proceeds to step 1312.

In step 1312, the process checks a value associated with the event against a predetermined vehicle instruction 52 threshold, e.g., a threshold such as described above regarding step 1206. The purpose of the predetermined threshold described with respect to this step is to allow a determination as to whether vehicle instruction 52, such as a drive-by-wire instruction, should be issued. Accordingly, if the event value is greater than the vehicle instruction 52 threshold, control proceeds to step 1314. Otherwise, the process ends.

In step 1314, the process composes and sends vehicle instruction 52 via Vehicle Network 112, which is connected to one or more vehicle busses 50. The process ends following step 1314.

Figure 10:
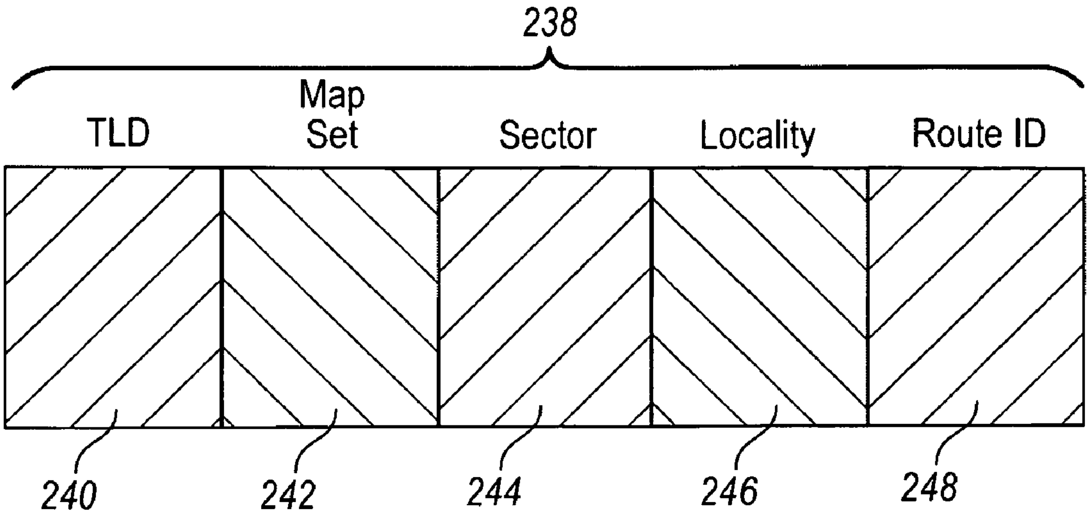
FIG. 10 illustrates an ITS message location packet based on a common map scheme, according to an embodiment.

FIG. 10 illustrates message 38 a location packet 238 based on a common map scheme, according to an embodiment. As part of message 38, location packet 238 includes one or more of a top level domain (TLD) 240, a map set identifier 242, a sector identifier 244, a locality identifier 246, and a route identifier 248 (route ID). TLD 240 may be used to determine what canonical mapping system the ENSAM 100 is using as a reference for the location. A canonical mapping system will be understood by those skilled in the art, and is simply a common set of geographical references used by each ENSAM 100. A canonical mapping system allows a first ENSAM 100 to communicate its position effectively to a second ENSAM 100 such that the position of the first ENSAM 100 is understood by the second ENSAM 100. The mapping system may be stored on each ENSAM in part or in whole. The canonical mapping system may also be stored in databases accessible to ITS 10 nodes 32. A canonical mapping system according to certain embodiments is described below in detail with respect to FIGS. 17-20.

Map set identifier 242 may be used to determine which map references should be used to compare the current position information of node 32 with the position information embedded in the remaining message 38 packets. Further reducing the position of the reference location are sector identifier 244 and locality identifier 246. These may be used to further discriminate the general location the message 38 sender or the hazard identified in message 38.

Route ID 248 may also be included as a reference to a particular road and may also include a direction indicator to discriminate what side of the road is being addressed or a location along the road, i.e. a mile marker. In a canonical mapping scheme, so long as the TLD 240 and/or map set identifier 242 are recognized by ENSAM 100, the unique route ID 248 and other information fully describes the location and situation of the transmitting node 32. In this way, a more complete description of vehicle 12, 14, 18, etc. and/or hazard 206 may be transmitted in message 38 along with absolute latitude and longitude information.

Alternately, rather than describe location packet 238 with top level domain (TLD) 240, map set identifier 242, sector identifier 244, locality identifier 246, and route identifier (route ID) 248, nothing more than latitude and longitude information may be transmitted in location packet 238. Receiving node 32 may then interpret the location data based upon its own mapping scheme. Although not illustrated in FIG. 10, message 38 location packet 238 may also include a unique identifier describing RF transceiver and Data Link 100.

Figure 11:
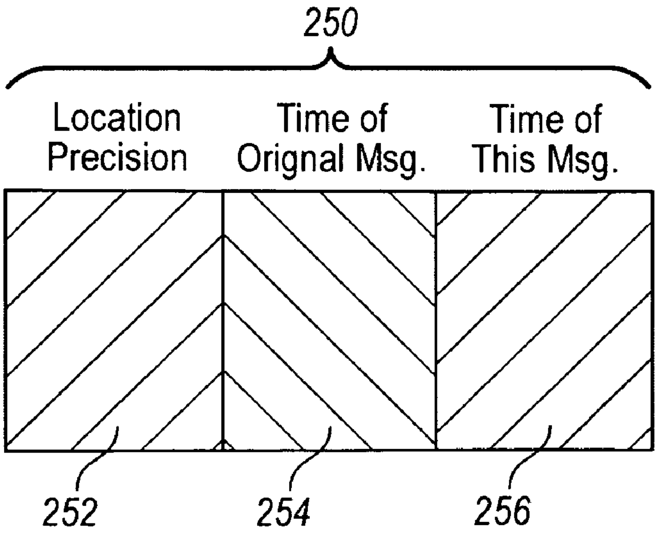
FIG. 11 illustrates an ITS message precision packet for determining the accuracy of the position information in an ITS message transmission, according to an embodiment.

FIG. 11 illustrates message 38 having a precision packet 250 for determining the accuracy of the position information in a message 38 transmission. Precision packet 250 includes a location precision 252, an original message time 254, and a time of the current message 256. Location precision 252 provides precision information that allows for the receiver of message 38 to determine how accurate the location packet 238 data is. Examples of precision information may include “high precision” based on differential GPS, known to those skilled in the art, or “low precision” based on long-term inertial navigation, also known to those skilled in the art. A receiving node 32 may use location precision 252 to address whether information instruction 54 applies to the receiver or how large the area of interest message 38 relates to. If message 38 applies to a pot-hole on a road, a higher level of precision may be required to determine which lane(s) of the roadway are affected. However, if information instruction 54 is of an airborne chemical spill, lower levels of precision would still have value.

Original message time 254 may be included to determine if the received message 38 was originally sent too long ago to be useful. That is to say that message 38 has become “stale.” Time of the current message 256 may be sent alternatively by the transmitter of message 38 or could be injected by the receiver of message 38. If, for example, each ENSAM 100 node 32 is set up to repeat a hazard warning, the warning should eventually expire.

Figure 12:
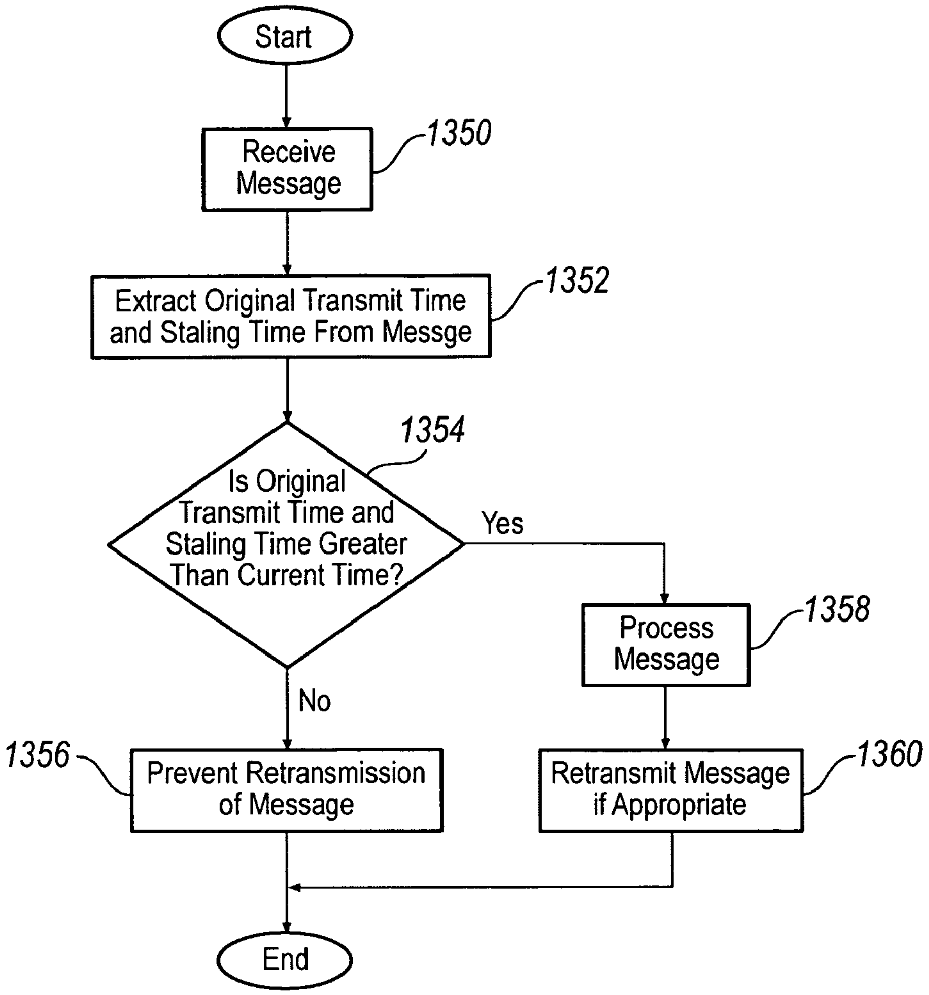
FIG. 12 illustrates ITS message retransmission within an expiration time, according to an embodiment.

FIG. 12 illustrates message 38 retransmission within an expiration time, according to some embodiments. Certain embodiments use the process outlined in FIG. 12 for determining the time-based expiration of message 38. In step 1350, the process gets message 38. Control proceeds to step 1352.

In step 1352, the processor extracts the original transmit time and a predetermined expiration, or “staling” time, from message 38. Control proceeds to step 1354.

In step 1354, the processor makes a second determination and adds the original transmit time with the staling time and compares the sum to the current time. If the sum is greater than the current time, control proceeds to step 1358. Otherwise, control proceeds to step 1356.

In step 1356, the processor prevents retransmission of message 38 due to time staling. That is to say, message 38 has outlived its intended time duration. The process ends following step 1356.

In step 1358, message 38 is processed, e.g., as described above. Control proceeds to step 1360.

In step 1360, the processor retransmits message 38 if appropriate, behaving as a repeater. The process ends following step 1360.

Further expanding upon the retransmission of message 38, the retransmitted message may be an exact duplicate of the original or message 38 may be modified and retransmitted depending upon the content of the message received and the repeaters condition. The retransmitted message may include, position information, directional information, range information, time information, warning information, map information, text information, and traffic condition information, whereby a yet another node 32 may determine if the message should be repeated. The decision making steps for retransmission may be applied to any information contained in message 38 or a combination of message 38 information with the receiving time and/or geographic characteristics of the repeating node.

Figure 13:
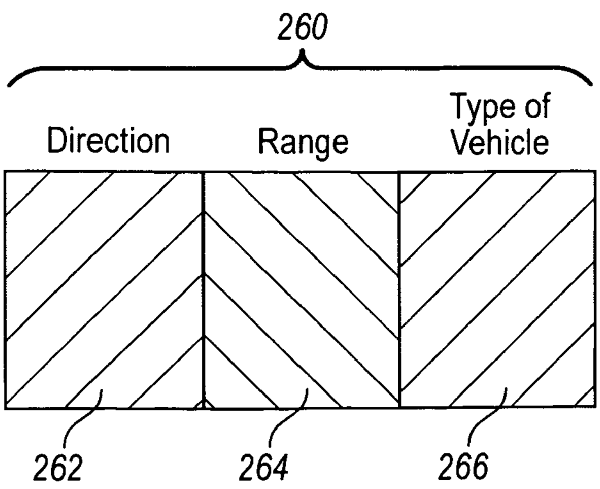
FIG. 13 illustrates an ITS message packet containing scope information, according to an embodiment.

FIG. 13 illustrates a scope packet 260, pertaining to the scope of message 38 or the information contained therein, according to an embodiment. Scoping packet 260 is used to describe how far message 38 should be allowed to propagate geographically from an originating node 32, and/or in what direction message 38 should propagate. Scoping data prevents message 38 from being repeated outside the intended area or for longer than an intended time. Using both directionality and time, message 38 becomes stale and no longer is repeated when the receiver is outside of the intended geographic range and/or when the time expires. Vehicles 12, 14, 18, etc. within an ITS 10 decode message 38 and no longer repeat message 38 if appropriate. For example, if message 38 is a distress signal, a direction indicator 262 may be set to omni-directional. On the other hand, if message 38 is to warn a driver of a hazard on divided highway, direction indicator 262 may be set to only propagate behind the transmitting vehicle in order to only warn upstream vehicles. Direction indicator 262 may include compass directions such as North, South, East, and West, and combinations thereof, and also up-stream and down-stream indicators based on the route ID 248, or the omni-directional setting.

A range indicator 264 is further utilized to curb the extent, or distance, message 38 is allowed to propagate in the network. Contrasted with precision packet 250, which, as described above, is used to determine the accuracy of a position location, range indicator 264 is used to determine at what distance from a location that message 38 should be used. For example, a warning of a pot-hole is not needed a hundred miles away. Only traffic localized to such a simple hazard need be warned. However, a chemical spill may be omni-directional with a large radius to warn travelers of the hazard. Further, a vehicle type 266 indicator may be used to filter what type of vehicle for which message 38 is intended. Message 38 could be intended for consumption for, and thus only received by, a light-weight vehicle, truck 18, car 12 or 14, airplane 28, boat 26, etc.

Figure 14:
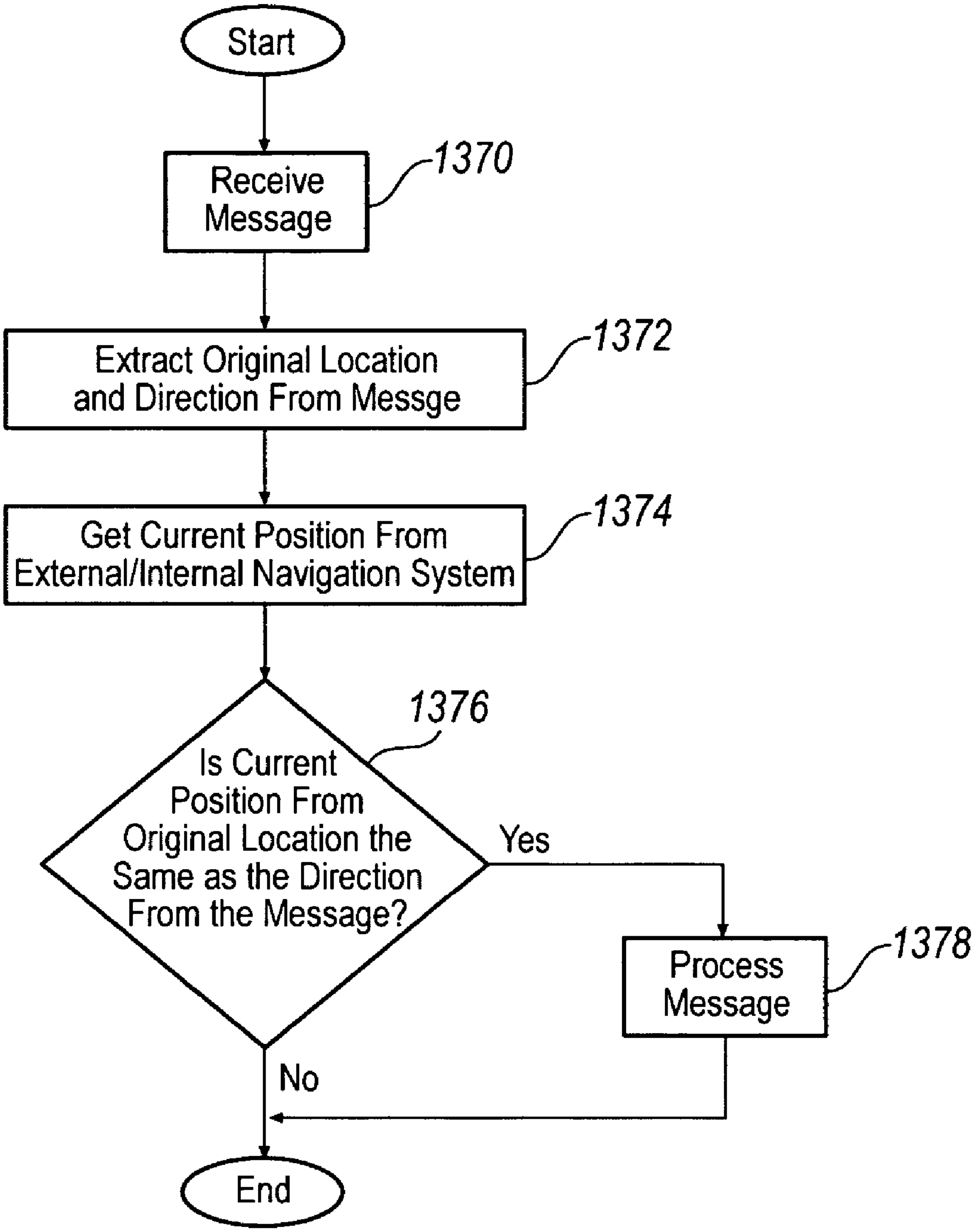
FIG. 14 illustrates the decision process when receiving a directional message of the ITS, according to an embodiment.

FIG. 14 illustrates a decision process when receiving a directional message 38, according to certain embodiments. In step 1370, the process receives message 38. Control proceeds to step 1372.

In step 1372, the process extracts the original location and direction from message 38. The location may be the location of an event, location of a hazard, location of vehicle 12, or the location of the transmitting node 32. Control proceeds to step 1374.

In step 1374, the process gets the current position from the External/Internal Navigation System, e.g. Satellite Navigation Receiver 102 and/or Inertial Navigation Unit 104. Control proceeds to step 1374.

In step 1376, the process makes a first determination and checks if the direction of the current position of the present node 32 with respect to the origin of message 38 is the same as the direction in which message 38 was traveling when received. Step 1376 may also compare the location of the event, extracted in from message 38 step 1374, to a geographic characteristic of the node 32. The geographic characteristics include, but are not limited to, the position of node 32 and a direction of node 32 relative to another location that may include the event location. If so, control proceeds to step 1378. Otherwise, the process ends.

In step 1378, message 38 is processed, e.g., as described above. The process ends following step 1378.

Figure 15:
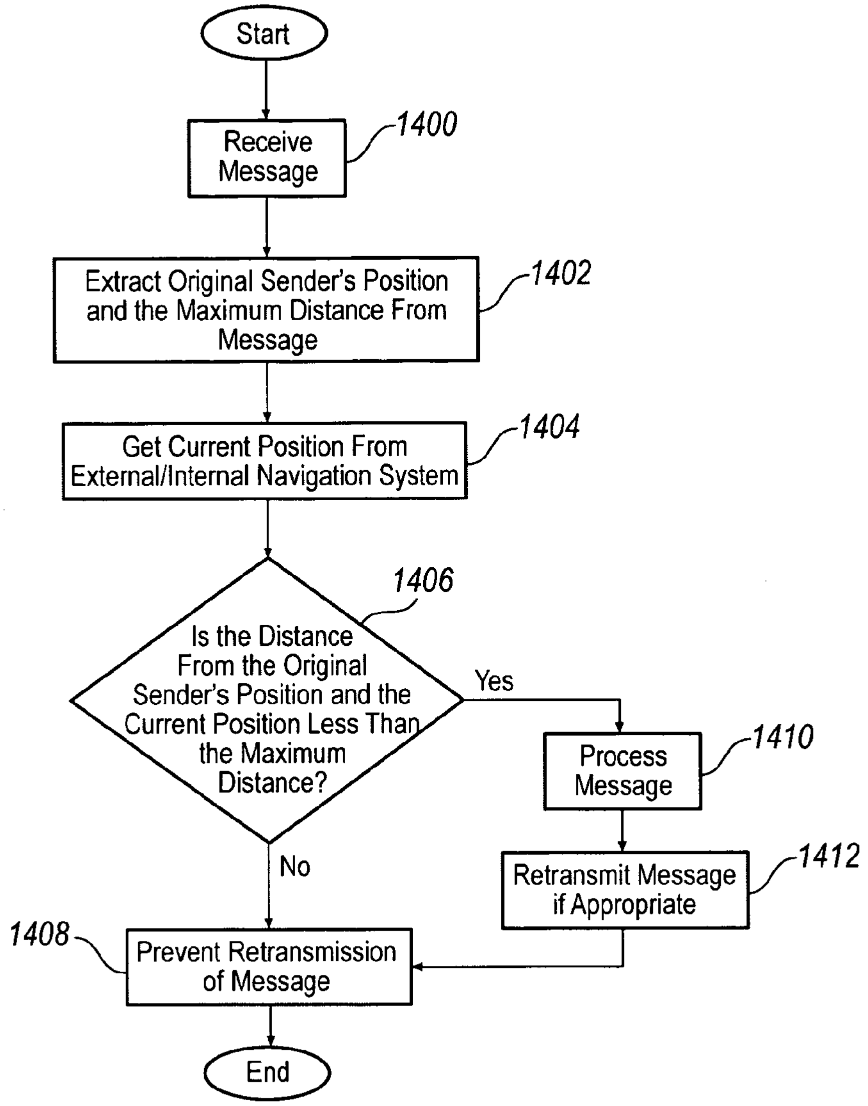
FIG. 15 illustrates a range limit applied to the ITS message, according to an embodiment.

FIG. 15 illustrates a range indicator 264 applied to message 38, according to certain embodiments. In step 1400, the process receives message 38. Process control proceeds to step 1402.

In step 1402, the process extracts the original senders' position and range indicator 264, and the maximum distance from that original senders' position at which message 38 is supposed to be accepted. Control proceeds to step 1404.

In step 1404, the process gets the current position from Satellite Navigation Receiver 102 and Inertial Navigation Unit 104. Control proceeds to step 1406.

In step 1406, the processor makes a second determination and checks if the distance from the original senders' position and the current position is less than range indicator 264. If so, control proceeds to step 1410. Otherwise, control proceeds to step 1408.

In step 1408, the processor prevents retransmission of message 38. The process ends following step 1408.

In step 1410, message 38 is processed, e.g., as described above. Control proceeds to step 1412.

In step 1412, the processor retransmits message 38 if appropriate, acting as a repeater. The process ends following step 1412.

Figure 16:
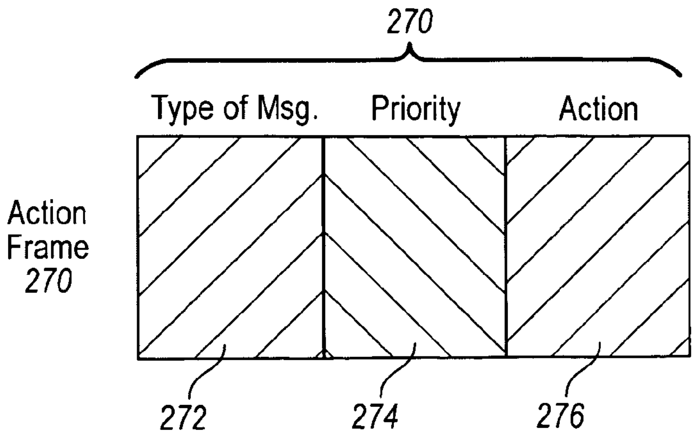
FIG. 16 illustrates an ITS action packet containing information ultimately for use by an ITS node, according to an embodiment.

FIG. 16 illustrates an action packet 270 containing information ultimately for use by node 32, according to an embodiment. A message type 272 identifier, a priority identifier 274 and an action identifier 276 may be included in action packet 270. An original sender of action packet 270 encodes the pertinent data into action packet 270, included in message 38, based upon detected conditions, e.g., hazards 206. For example, if the condition were a pot-hole, message type 272 may be set to a "warning." However, if the condition were a severe accident, message type 272 may be set to "emergency." Further, details such as traffic density may be encoded as "informational." Although it would appear that message type 272 could be used to indicate criticality, that function is generally reserved for priority identifier 274 that encodes and delineates the importance of the message. It should be understood that node 32 may ultimately determine the significance of message 38 based on a combination of inputs.

Figure 17:
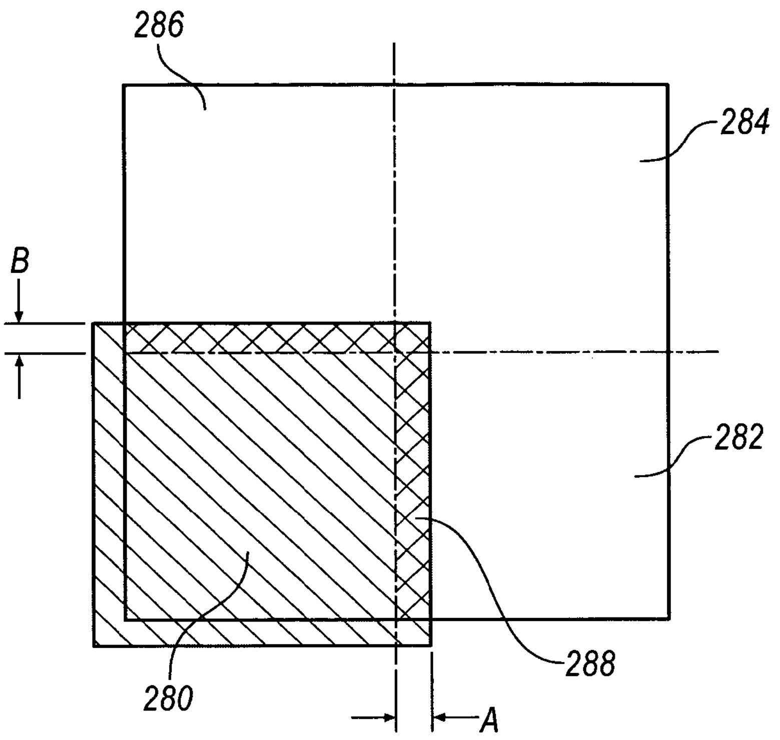
FIG. 17 illustrates an ITS using overlapping map sectors with common mapping to determine location, according to an embodiment.

FIG. 17 illustrates use of overlapping map sectors with common mapping schemes to determine location, according to certain embodiments. A target sector 280 is adjacent to sectors 282, 284, and 286. An overlapping region 288 may be used to verify map integrity and reduce sector switching by nodes 32. By using overlapping region 288, a particular node 32 may reduce sector switching if traveling along the sector boundary by using simple hysteresis provided by overlapping region 288. An abscissa overlap distance A represents an overlap of from target sector 280 to adjacent sectors 282, 284 along the abscissa, or "x" axis, of the map as shown. Similarly, an ordinate overlap distance B represents an overlap of from target sector 280 to adjacent sectors 284, 286 along the ordinate, or "y" axis, of the map as shown. Abscissa overlap distance A or ordinate overlap distance B may be adjusted as necessary to provide for map integrity verification or to adjust ITS sector position hysteresis as necessary.

Route checking may be accomplished using overlapping region 288 to cross-check routes and positions. If routes do not match when adjacent sectors are compared, in this case target sector 280 and sector 282, then a navigational error may be detected and appropriate action taken. When a route mismatch occurs, node 32 may send message 38 to instruct other vehicles around it of the problem and report the mismatch to a central location providing surveying capability to update ITS maps automatically for nodes 32 in an ITS 10. Node 32 determining the mismatch may also request map updates and recheck map integrity to determine if there is a fault in the map system, ENSAM 100, or some other module. As mapping systems become more advanced and accurate, the overlaps A, B may be reduced. However, overlaps A, B may still be desirable to provide map position hysteresis as described above.

Figure 18:
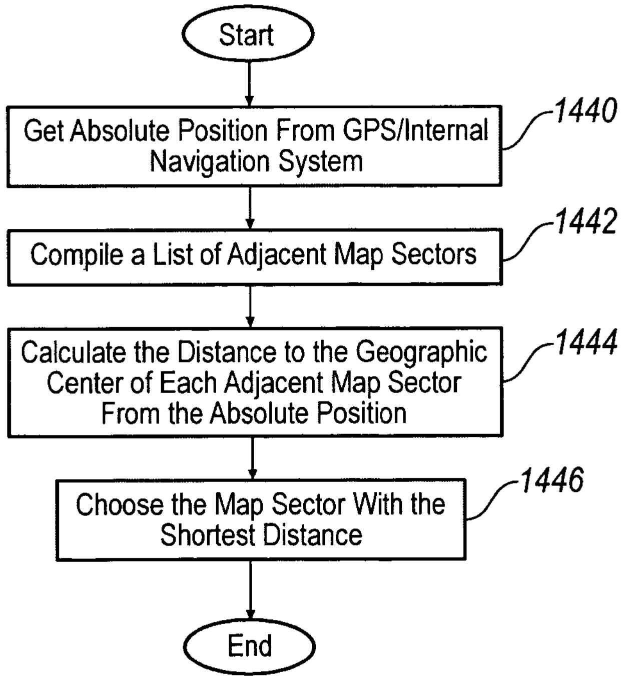
FIG. 18 illustrates selection of a map sector, according to an embodiment.

FIG. 18 illustrates selection of a target sector 280, according to an embodiment. In step 1440, an absolute position according to a canonical mapping scheme, possibly a latitude and longitude, is received from Satellite Navigation Receiver 102 and Inertial Navigation Unit 104. Control proceeds to step 1442.

In step 1442, the process compiles a list of adjacent map sectors based upon the absolute position received in step 1440. Control proceeds to step 1444.

In step 1444, the process determines the geographic center of each map sector and calculates the distance from the absolute position and the geographic center for each sector. Control proceeds to step 1446.

In step 1446, the process chooses the map sector with the shortest distance calculated in step 1444. The process ends following step 1446.

Figure 19:
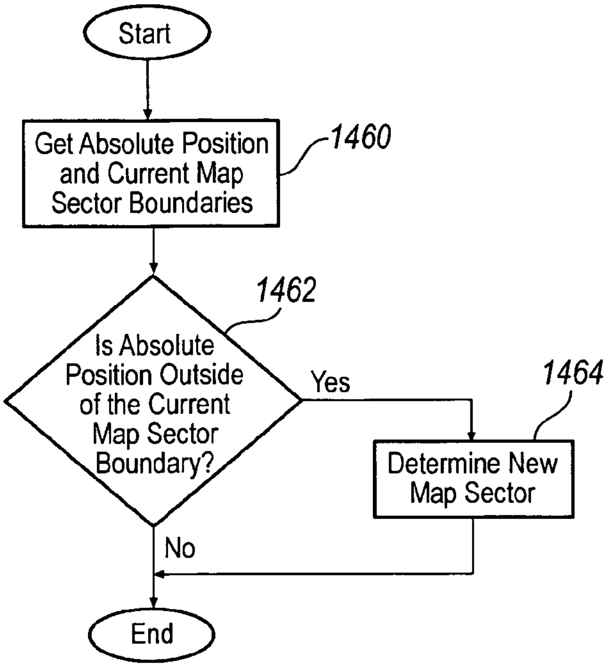
FIG. 19 illustrates switching from a current map sector to a new map sector based upon boundaries, according to an embodiment.

FIG. 19 illustrates switching from a current map sector to a new map sector based upon boundaries. Accordingly, embodiments discussed herein use the process outlined in FIG. 19 for switching map sectors. In step 1460, the process gets the absolute position from Satellite Navigation Receiver 102 and Inertial Navigation Unit 104 and the current sector boundaries. Control proceeds to step 1462.

In step 1462, the process determines whether the absolute position determined in step 1440 lies outside of the current sector boundary. If so, control proceeds to step 1464. Otherwise, the process ends.

In step 1464, the processor determines the geographic center of each map sector and calculates the distance from the absolute position and geographic center, each determined as described above, for each sector. The process ends following step 1464.

Figure 20:
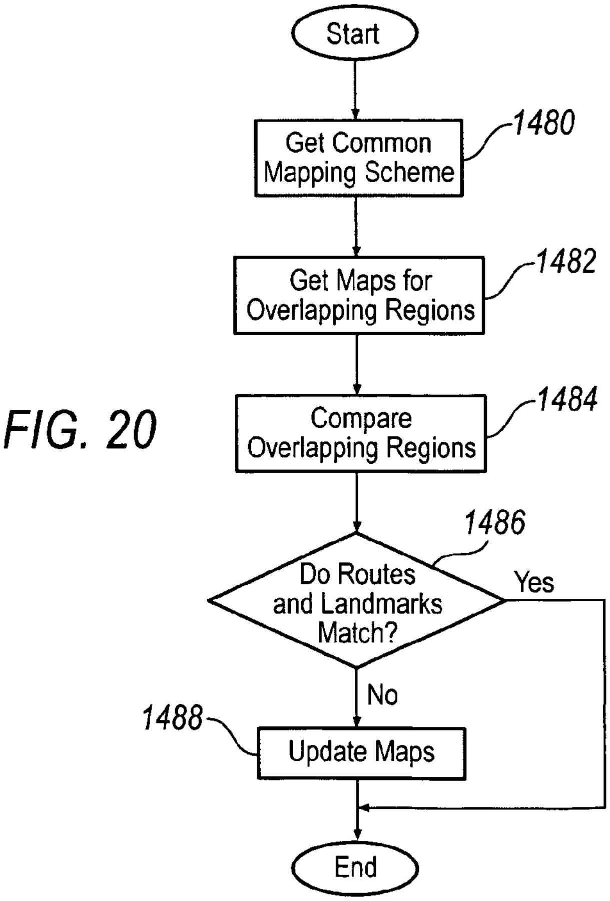
FIG. 20 illustrates route checking of sectors using overlapping region to cross-check routes and positions, according to an embodiment.

FIG. 20 illustrates route checking of sectors using overlapping region 288 to cross-check routes and positions, according to certain embodiments. In step 1480, the process determines the common mapping scheme. Control proceeds to step 1482.

In step 1482, maps for any overlapping regions of the current map sector are determined. For example, a processor 106 might determine such maps by accessing memory 108. Control proceeds to step 1844.

In step 1484, the process compares the map sectors at the overlapping regions. Control proceeds to step 1486.

In step 1486, the process checks if the routes and landmarks match in the overlapping regions. If so, the process ends. Otherwise, control proceeds to step 1488.

In step 1488, the process requests updated maps. The process ends following step 1488.

Figure 21:
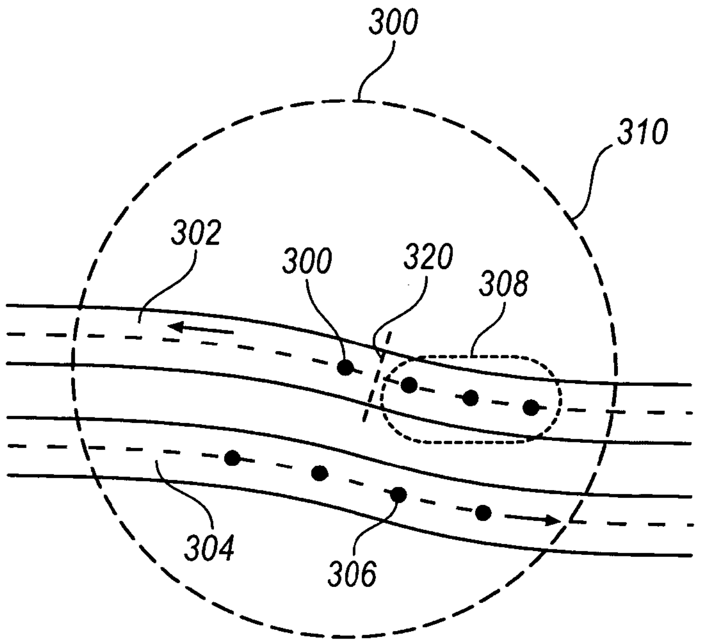
FIG. 21 illustrates the directional messaging capability of an ITS, according to an embodiment.

FIG. 21 illustrates the directional messaging capability within an ITS 10, according to certain embodiments. A detecting vehicle 300 travels along a hazarded roadway 302 where a hazard event 320 threatens vehicular traffic. Upstream vehicles following detecting vehicle 300 are within in a hazarded region 308. An opposite roadway 304 carries an uninterested vehicle 306, unaffected by hazard event 320 along hazarded roadway 302. After detecting vehicle 300 detects hazard event 320, detecting vehicle 300 transmits a hazard warning message 38 within a messaging area 310. All vehicles within messaging area 310 receive the hazard warning message 38 but some do not act upon it. Vehicles traveling downstream of detecting vehicle 300 on hazarded roadway 302 are not concerned with hazard event 320 and do not react to the hazard warning message 38 because they have already past hazard event 320. Uninterested vehicle 306 on driving on opposite roadway 304 also does not react to the hazard warning message 38 because hazard 320 is neither within the path of, nor does it threaten uninterested vehicle 306. There is no threat to uninterested vehicle 306 because the hazard lies on a different roadway, hazarded roadway 302. However, vehicles within hazarded region 308 parse message 38 and take appropriate action to avoid hazard event 320 because hazard 320 is within their immediate and/or future path.

Figure 22:
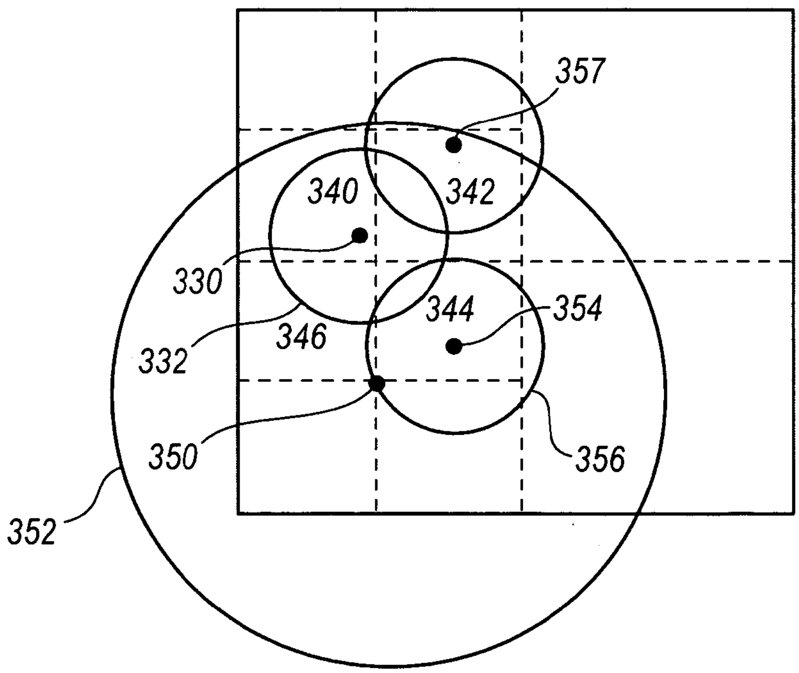
FIG. 22 illustrates the directional relay capability of ITS within map sectors.

FIG. 22 illustrates the directional relay capability nodes 32 within map sectors, according to certain embodiments. Suppose a detecting vehicle 330 is within a map sector 340 and has detected a serious hazard such as chemical spill. Detecting vehicle 330 includes processor 106 that is programmed to transmit messages 38 according to the nature of the hazard. The location of a nearest stationary base 350 downwind of the chemical spill is known by detecting vehicle 330. Stationary base 350 is warned of the event so that stationary base 350 can retransmit the warning message 38 over a wide range. Detecting vehicle 330, who knows the location of stationary base 350, sends a directional message 38 to provide stationary base 350 with the event information. In this case, detecting vehicle 330 sends message 38 with the target receiver information and direction information encoded into message 38. Because stationary target 350 is outside of the range of detecting vehicle 330, a repeater vehicle 354 receives message 38, and processing occurs within repeater vehicle 354 to determine whether to retransmit message 38 (as discussed above regarding see FIGS. 14-15) based on the relative location of repeater vehicle 354, as well as the location and direction information encoded into the warning message 38 sent from detecting vehicle 330.

As illustrated in FIG. 22, with respect to detecting vehicle 330, repeater vehicle 354 lies generally in the direction of stationary base 350 and thus repeater vehicle retransmits message 38 with similar directional and target instructions. The transmission from repeater vehicle 354 then reaches stationary base 350. If any other vehicles beyond stationary base 350 with respect to detecting vehicle 330 receive message 38 from repeater vehicle 354, they do not act upon it because they are beyond the target location in the stale direction, and thus message 38 ceases to be retransmitted beyond the target. A non-repeating vehicle 357 receives the directional message 38 from detecting vehicle 330, but does not repeat message 38 because non-repeating vehicle 38 is not positioned in the direction requested in message 38 relative to detecting vehicle 330. ITS 10 accordingly advantageously ceases communications, and thereby avoids race conditions, without the typical acknowledgement messaging transmissions.

Stationary base 350 is an example of a non-vehicle ITS node 32. As noted above, in some embodiments ITS 10 comprises both nodes 32 that are vehicles and nodes 32 that are not vehicles. In some embodiments, certain nodes 32 are fixed ITS transceivers, such as stationary base 350, used to broadcast messages 38 to any listening nodes 32 in ITS 10. In some embodiments, fixed ITS transceiver nodes 32 are connected to traffic control mechanisms or other structures that may impact traffic flow. For example, a broadcast node 32 could be located at a railroad crossing, and messages 38 sent indicating whether the crossing gates were raised or lowered. Stoplights or other traffic control mechanisms could also be connected to RF transceivers functioning as a node 32 on ITS 10 network.

Referring now back to FIG. 22, in another example, detecting vehicle 330 transmits an omni-directional hazard warning message 38 within a first zone of influence 332. Although unaffected, repeater vehicle 354 within an unaffected sector 344 is receiving message 38 of the spill. Because the nature of the warning message 38 is a serious hazard, repeater vehicle 354, even though safe in unaffected sector 344, retransmits the warning message 38. Stationary base 350, receiving the warning message 38, and having a large zone of influence 352 that is used to provide generalized intelligent traffic control, retransmits message 38 to vehicles that may be in danger. Due to the nature of the hazard in this case, stationary base 350 may warn vehicles beyond sector 340 or the route that detecting vehicle 330 and the hazard are located. This allows for generalized re-routing of traffic within the zone of influence 352 of base station 350 to avoid the hazard near detecting vehicle 330.

Dynamic Virtual Avoidance Markers

Figure 23:
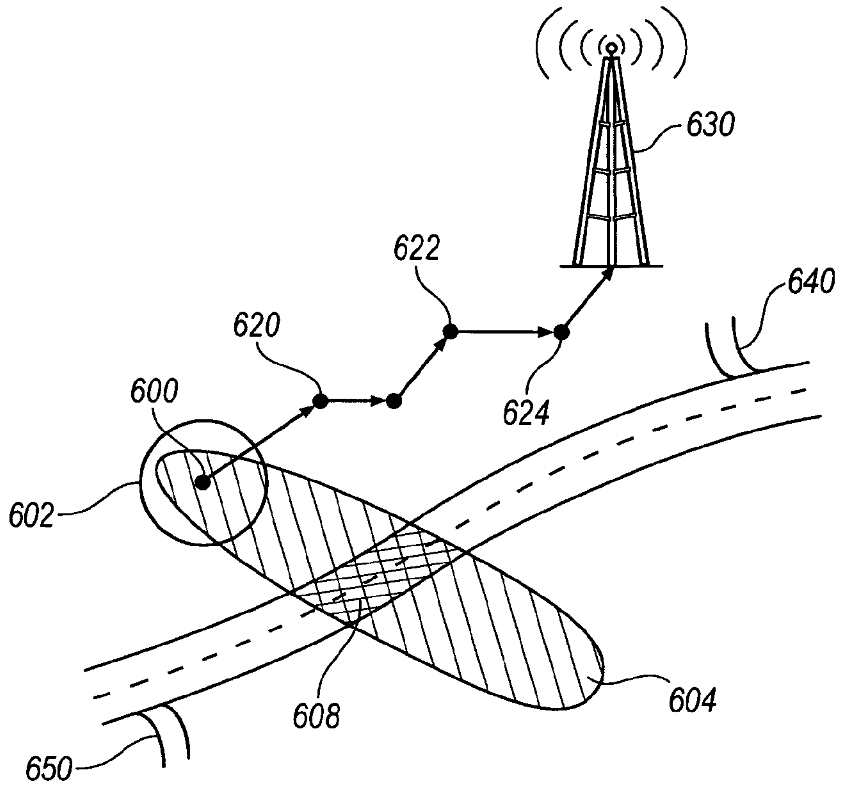
FIG. 23 illustrates a dynamic virtual avoidance marker of an embodiment.

FIG. 23 illustrates a dynamic virtual avoidance marker 604, according to an embodiment. Embodiments having nodes 32 that are not vehicles facilitate (but are not necessary for) dynamic virtual avoidance markers 604, which enable vehicles 12, 14, 18, etc. to avoid hazardous areas altogether. For example, suppose that a tanker car in a freight train suffered a breech. In such event, a pressure transducer would sense a loss in pressure, and predetermined rules in processor 106 would determine that a breech likely had occurred. Processor 106 would then cause RF transceiver and Data Link 110 to transmit data to other nodes 32 within ITS 10, which data may then be rebroadcast by a fixed ITS transceiver, such data including vehicle type (e.g., rail), vehicle use (tanker transport), cargo code (gaseous toxin), location (precise latitude and longitude), and spatial orientation (determined by inertial measurement unit 104). Data transmitted by RF transceiver and Data Link 110 could also include boundaries for the area to avoid because of the tanker breech. Processor 106 may calculate such boundaries by determining the precise location of the tanker car along with other inputs, such as wind conditions, outside air temperature, the nature of the surrounding terrain, and so forth.

For example, suppose a train car 600 has derailed and is leaking toxic gas. The immediate potentially affected region 602 has been alerted via ITS 10 node 32 installed in train car 600. However, due to wind conditions, a greater area may be at risk due to the toxic gas becoming airborne. Therefore, node 32 sends message 38 to the nearest stationary transmitter 630. However, stationary transmitter 630 is not within range of train car 600. In this case, train car 600 sends message 38 with directional information encoded in directional indicator 262, in scoping packet 260, described above with reference to FIG. 13. Repeater vehicles 620, 622, and 624 receive message 38 and determine that they are on the requested direction from the sender, as described above with reference to FIGS. 13-15, and thus repeat message 38 until it reaches stationary transmitter 630. When message 38 is processed, stationary transmitter 630 begins transmitting and warning, sending a new message 38, with dynamic virtual avoidance marker 604 mapped out that takes into account the type of accident and the weather conditions that may spread the toxic gas. Since dynamic virtual avoidance marker 604 crosses a roadway 608, vehicles receiving the warning message will avoid dynamic virtual avoidance marker 604 by exiting roadway 608 at exits 640 and 650.

Figure 24:
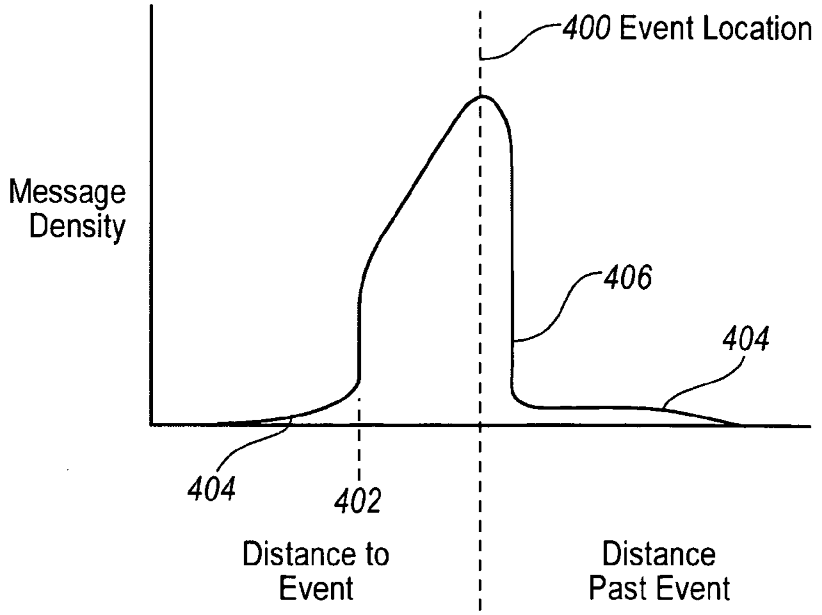
FIG. 24 is a chart illustrating ITS message density at distances approaching an event and distances past an event.

FIG. 24 is a chart illustrating message 38 densities at distances approaching an event and distances past an event. At extreme distances, a level 404 of background messages 38 are present on either side of an event location 400. Background messages 38 may be produced by base stations 350, as illustrated in FIG. 10, or from various mobile nodes 32. Background messages 38 may include general traffic information covering a region, re-route information, or warnings. As mobile node 32 approaches event location 400, an effective approaching distance 402 density of messages 38 begins to rise. This is due to many nodes 32 sending reports of an event as they pass event location 400, or nodes 32 repeating notice of the event to approaching nodes 32. Note that the message 38 density is the highest at, and immediately surrounding, event location 400. As mobile node 32 passes event location 400, a sharp reduction 406 in message 38 traffic results due to the message 38 directionality chosen for the specific event. A mobile node 32 that has passed event location 400 is no longer interested in messages 38 related to event 400, and thus, messages 38 past event location 400 are not processed. Similarly effective approaching distance 402 illustrates how message 38 traffic is reduced significantly to vehicles approaching event 400 from great distances. For vehicles 12, 14, 18, etc. approaching event 400 from greater distances, such vehicles 12, 14, 18, etc. would only receive background messages 38 until coming within effective approaching distance 402. At that time, message 38 traffic would increase significantly because event location 400 is now relevant. Note that if message 38 sent were omni-directional, that message 38 density on the left hand side of the graph shown in FIG. 24, notably effective approaching distance 402, would be mirrored on the right hand side of the graph.

The novel structures, systems, and features disclosed herein have been particularly shown and described with reference to the foregoing embodiments, which are merely illustrative of the best modes for carrying out the claimed invention. It will be understood by those skilled in the art that various alternatives to the embodiments described and claimed herein may be employed without departing from the spirit and scope of the invention as defined in the following claims. It is intended that the following claims define the scope of the invention, and that the method and apparatus within the scope of these claims, and their equivalents, be covered thereby. This disclosure should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

With regard to the processes, methods, heuristics, etc. described herein, it should be understood that, although the steps of such processes, etc. have been described as occurring according to a certain ordered sequence, such processes could be practiced with the described steps performed an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

The novel structures, systems, features, processes, methods, heuristics, etc. disclosed herein have been particularly shown and described with reference to the foregoing embodiments, which are merely illustrative of the best modes for carrying out the claimed invention. It will be understood by those skilled in the art that various alternatives to the embodiments described and claimed herein may be employed without departing from the spirit and scope of the invention as defined in the following claims. Although the steps of such processes, methods, heuristics, etc. have been described as occurring according to a certain ordered sequence, such processes could be practiced with the described steps performed an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention. It is intended that the following claims define the scope of the invention, and that the method and apparatus within the scope of these claims, and their equivalents, be covered thereby. This disclosure should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of transportation systems, and that the disclosed systems and methods will be incorporated into such future embodiments. Accordingly, it should be understood that the invention is capable of modification and variation and is limited only by the following claims.

We claim:

1. A system, comprising:

a mobile node in a vehicle for communications in a transportation network, the mobile node comprising:

a first processor;

a first memory;

a first communication device configured to send and receive one or more messages; and a first set of instructions executable by the first processor for:

a. extracting a location of an event from a first message;

b. making a first determination by comparing the location of the event to a geographic characteristic of the mobile node; and c. sending a second message based on the first determination; and a stationary node for communications in the transportation network, the stationary node comprising:

a second processor;

a second memory;

a second communication device configured to send and receive one or more messages; and a second set of instructions executable by the second processor for:

a. receiving the second message;

b. extracting a location of an event from the second message;

c. making a second determination at least in part by comparing the location of the event to a geographic characteristic of the stationary node;

d. making a third determination as to whether a third message should be sent based on the second determination.

2. The system of claim 1, wherein said geographic characteristic of the mobile node is at least one of a position of the mobile node, a velocity of the mobile node, and a direction of the mobile node.

3. The system of claim 1, said first set of instructions further comprising instructions for:

a. sending the second message.

4. The system of claim 1, wherein the mobile node is attached to a vehicle.

5. The system of claim 1, further comprising a vehicle network interface, said instructions further comprising instructions for:

making a third determination as to as to whether information extracted from the first message surpasses a predetermined threshold; and a. if the information surpasses the threshold, sending a communications directive via said vehicle network interface.

6. The system of claim 1, further comprising a position sensor, wherein the position sensor comprises an external navigation system, and further wherein the second message includes a position of the mobile node.

7. The system of claim 1, wherein the first message includes at least one of:

directional information, whereby a message recipient may determine if the message should be repeated;

range information, whereby a message recipient may determine if the message should be acted upon;

time information, whereby a message recipient may determine if the message should be acted upon; and target receiver information, whereby a message recipient may determine if the message is intended for reception.

8. The system of claim 1, wherein the second message includes at least one of:

directional information, whereby a message recipient may determine if the message should be repeated;

range information, whereby a message recipient may determine if the message should be acted upon;

time information, whereby a message recipient may determine if the message should be acted upon; and target receiver information, whereby a message recipient may determine if the message is intended for reception.

9. The system of claim 1, wherein the communications directive includes a command for the vehicle to maintain a specified distance from at least one other vehicle.

10. The system of claim 1, wherein the communications directive includes a command for the vehicle to change lanes.

11. The system of claim 1, further comprising a third node configured to operate as a dynamic virtual avoidance marker that provides an alert concerning a hazard condition associated with the second node, said alert provided in the first message that is sent to the mobile node.

12. A system, comprising:

a mobile node in a vehicle for communications in a transportation network, the mobile node comprising:

a first processor;

a first memory;

a first communication device configured to send and receive one or more messages; and a first set of instructions executable by the first processor for:

a. receiving a first message from said communication device;

b. making a determination as to whether information extracted from the first message surpasses a predetermined threshold, thereby determining a significance of the first message;

c. if the information surpasses the threshold, creating a second message;

d. if the information surpasses the threshold, providing at least one command to a controller in the vehicle to cause the vehicle to perform at least one of altering the vehicle's direction and altering the vehicle's speed; and sending the second message based on the first determination; and a stationary node for communications in the transportation network, the stationary node comprising:

a second processor;

a second memory;

a second communication device configured to send and receive one or more messages; and a second set of instructions executable by the second processor for:

a. receiving the second message;

b. extracting a location of an event from the second message;

c. making a second determination at least in part by comparing the location of the event to a geographic characteristic of the stationary node;

d. sending a third message based at least in part on the second determination.

13. The system of claim 12, wherein the determination of significance is based on a geographic characteristic of the node.

14. The system of claim 12, wherein the determination of significance is based at least in part on the relative position of the node to at least one second node.

15. The system of claim 12, wherein the second message includes at least one of position information, directional information, range information, time information, warning information, map information, text information, and traffic condition information.

16. The system of claim 12, wherein the message sent includes target receiver information, whereby a second node may determine if the message is intended for reception.

17. A method, comprising:

receiving a first message in a mobile node;

extracting a location of an event from the first message;

making a first determination by comparing the location of the event to a geographic characteristic of the node;

making a second determination as to whether a second message should be sent based on the first determination;

based on the first determination, providing at least one command to a controller in the vehicle to cause the vehicle to perform at least one of altering the vehicle's direction and altering the vehicle's speed;

sending the second message from the mobile node to a stationary node;

receiving the second message in the stationary node;

extracting a location of an event from the second message;

making a second determination at least in part by comparing the location of the event to a geographic characteristic of the stationary node; and sending a third message based at least in part on the second determination.

* * * * *